(12) United States Patent
Mok et al.

(10) Patent No.: US 7,136,713 B2
(45) Date of Patent: Nov. 14, 2006

(54) MANUFACTURING AND DE-FABRICATION ANALYSIS METHOD AND APPARATUS

(75) Inventors: Swee M. Mok, Schaumburg, IL (US); Chi-Haur Wu, Skokie, IL (US)

(73) Assignees: Motorola, Inc., Schaumburg, IL (US); Northwestern University, Evanston, IL (US)

( * ) Notice: Subject to any disclaimer, the term of this patent is extended or adjusted under 35 U.S.C. 154(b) by 224 days.

(21) Appl. No.: 10/655,096

(22) Filed: Sep. 4, 2003

(65) Prior Publication Data
US 2004/0138771 A1    Jul. 15, 2004

Related U.S. Application Data

(60) Provisional application No. 60/439,926, filed on Jan. 14, 2003.

(51) Int. Cl.
*G06F 19/00*    (2006.01)

(52) U.S. Cl. .................. 700/95; 700/95; 235/385; 705/27; 705/28

(58) Field of Classification Search ............. 700/95, 700/97; 283/36, 66.1; 40/360; 235/487, 235/494, 235; 705/27
See application file for complete search history.

(56) References Cited

U.S. PATENT DOCUMENTS

| | | | |
|---|---|---|---|
| 5,822,206 A | 10/1998 | Sebastian et al. | |
| 5,962,834 A * | 10/1999 | Markman | 235/385 |
| 6,268,853 B1 | 7/2001 | Hoskins et al. | |
| 6,453,209 B1 * | 9/2002 | Hill et al. | 700/95 |
| 6,892,943 B1 * | 5/2005 | Nakamura | 235/385 |
| 2002/0073114 A1 | 6/2002 | Nicastro et al. | |

FOREIGN PATENT DOCUMENTS

EP    1 081 028 A2    7/2001

* cited by examiner

*Primary Examiner*—Leo Picard
*Assistant Examiner*—Sheela S. Rao
(74) *Attorney, Agent, or Firm*—Fitch, Even, Tabin & Flannery

(57) ABSTRACT

A structured product coding system that reflects both the components as are used to fabricate a given product but component manipulators as are used to execute part-mating operations to combine the components and intermediate structures as are assembled during the fabrication process can be used to generate a generic assembly/disassembly tree that corresponds to that product.

17 Claims, 6 Drawing Sheets

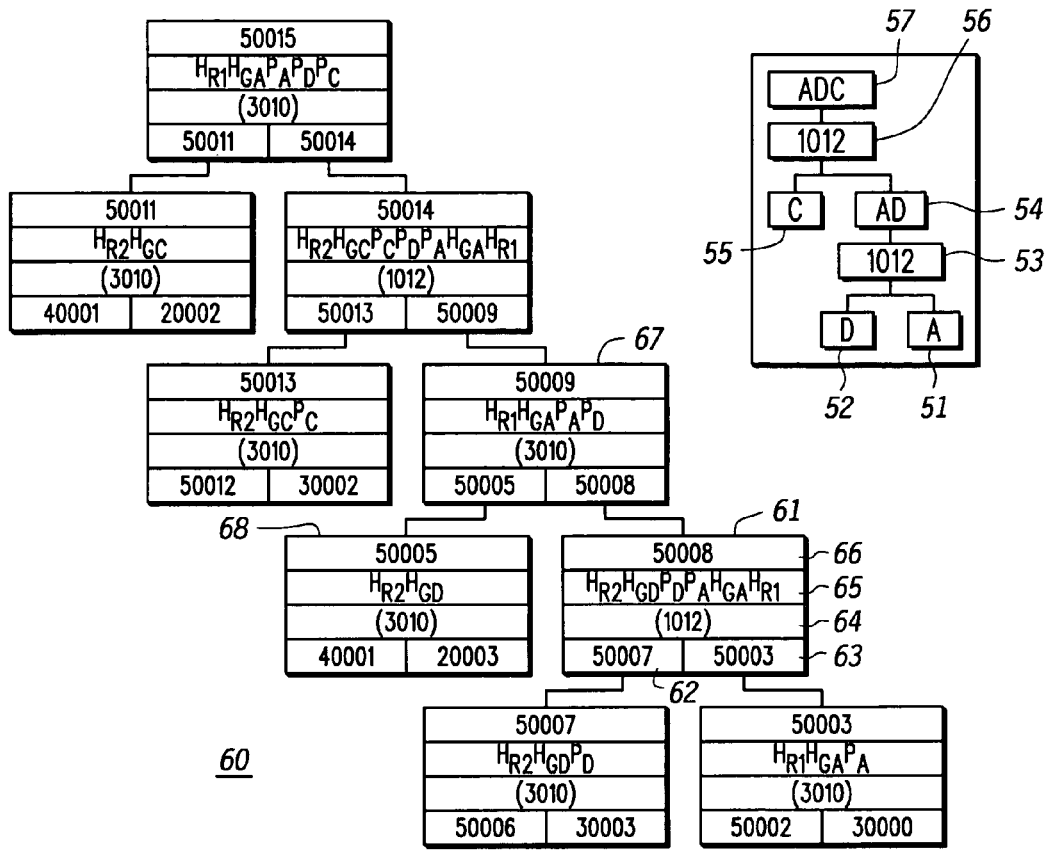
FIG. 6
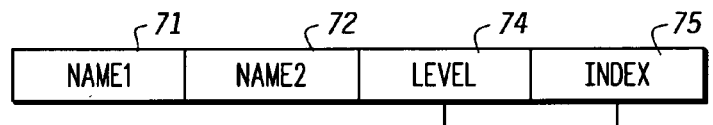
FIG. 7
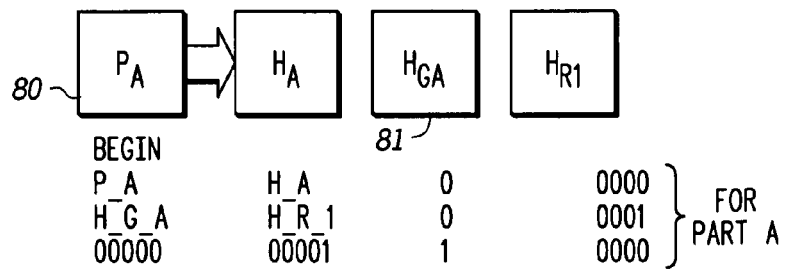
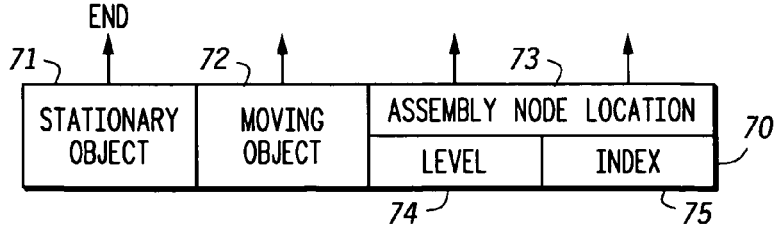
FIG. 8

| NAME | STATIONARY_PART | | MOVING_PART | | NEW_PART | | SACS CODE | SACS OPERATION | ASSEM. TREE LEVEL | ASSEMBLY (DISASSEMBLY) COST |
|---|---|---|---|---|---|---|---|---|---|---|
| | TYPE | INDEX | TYPE | INDEX | TYPE | INDEX | | | | |
| AGAINST_FIT | NA | NA | NA | NA | 0000 | 0000 | 0023 | NA | NA | A/D0023 |
| SCREW_FIT | NA | NA | NA | NA | 0000 | 0001 | 0023 | NA | NA | A/D0023 |
| SIMPLE PART MATING OPERATIONS... | NA | NA | NA | NA | 0000 | ... | ... | NA | NA | A/D... |
| SPH_AGAINST | NA | NA | NA | NA | 0000 | 0018 | 2300 | NA | NA | A/D2300 |
| P_0 | NA | NA | NA | NA | 0001 | 0000 | NA | NA | NA | ... |
| P_1 | NA | NA | NA | NA | 0001 | 0001 | NA | NA | NA | ... |
| P_N | NA | NA | NA | NA | 0001 | N | NA | NA | NA | ... |
| ... | NA | NA | NA | NA | ... | ... | ... | NA | NA | ... |
| H_G_0 | NA | NA | NA | NA | 0002 | 0000 | 3011 | NA | NA | A/D3011 |
| H_G_N | NA | NA | NA | NA | 0002 | N | ... | NA | NA | A/D... |
| H_0 | NA | NA | NA | NA | 0003 | 0000 | 3010 | NA | NA | A/D3010 |
| H_N | NA | NA | NA | NA | 0003 | N | ... | NA | NA | A/D... |
| H_R_0 | NA | NA | NA | NA | 0004 | 0000 | 3010 | NA | NA | A/D3010 |
| H_R_N | NA | NA | NA | NA | 0004 | N | ... | NA | NA | A/D... |
| ... | NA | NA | NA | NA | ... | ... | ... | NA | NA | A/D... |
| P_0 H_0 | 0001 | 0000 | 0003 | 0000 | 0005 | 0000 | 3010 | + | 0 | A3010 |
| H_G_0 H_G_0 | 0002 | 0000 | 0004 | 0000 | 0005 | 0001 | 3011 | + | 0 | A3011 |
| H_0 P_0 H_G_0 H_0 | 0005 | 0000 | 0005 | 0001 | 0005 | 0002 | 3011 | + | 1 | A3011 |
| H_0/P_0 H_G_0 H_R_0 | 0003 | 0000 | 0005 | 0002 | 0005 | 0003 | 3010 | - | 2 | D3010 |
| ADDITIONAL MODULES... | ... | | ... | ... | 0005 | ... | ... | ... | ... | A/D... |

*FIG. 9*

```
      100    102   101   103
       /      /    /    /
      BEGIN
       P_A    H_A    0    0
       H_G_A  H_R_1  0    1
       00     01     1    0
      END
      BEGIN
       P_B    H_B    0    0
       H_G_B  H_R_2  0    1
       00     01     1    0
      END
      BEGIN
       P_C    H_C    0    0
       H_G-C  H_R_2  0    1
       00     01     1    0
      END
      BEGIN
       P_D    H_D    0    0
       H_G_D  H_R_2  0    1
       00     01     1    0
      END

.....

BEGIN
       H_S_OPQR  H_R_2  0  0
       P_P       00     1  0
      END
      BEGIN
       H_S_OPQR  H_R_2  0  0
       P_Q       00     1  0
      END
      BEGIN
       H_S_OPQR  H_R_2  0  0
       P_R       00     1  0
      END
```

MANUFACTURING AND DE-FABRICATION ANALYSIS METHOD AND APPARATUS

RELATED APPLICATIONS

This application claims the benefit of Provisional Application Ser. No. 60/439,926, entitled "Structured Product Coding System" and filed on Jan. 14, 2003, which is incorporated herein by this reference.

TECHNICAL FIELD

This invention relates generally to manufacturing analysis.

BACKGROUND

An enterprise that manufactures one or more products must remain cognizant of a variety of issues and concerns. For example, a given product that the enterprise undertakes to fabricate must, in fact, be capable of fabrication by that particular enterprise. That is, the enterprise must have or be able to reasonably acquire the requisite components and must further be able to successfully assemble such components to realize the final product. As another example, the manufacturer must usually be able to effect fabrication of a given product in a cost-effective manner in order to attain or retain a desired level of competitive performance. This can include use of cost-effective components but can also include efficient use of other manufacturing resources (including, for example, various component manipulators). As yet another example, for a growing number of products in an increasing number of markets, the manufacturer must also concern themselves with eventual de-fabrication of their products in order to be in compliment with relevant recycling and/or disposal requirements. Other examples exist as well with the above examples serving only to suggest the scope of the problem.

In many cases, a manufacturing enterprise has little in the way of institutional knowledge regarding such matters. Various individuals may have personal knowledge and/or access to locally stored information regarding some or all of these illustrative points of concern, but such information rarely exists in a form that can be readily accessed and leveraged by, for example, a manager. Other manufacturers have made some progress towards improved gathering and consolidation of information regarding the components used to assemble their respective product lines. For example, computer aided design (CAD) platforms permit design engineers to identify and track the components that are used to construct a given product. Such CAD systems readily permit file-sharing practices that accordingly permit access to such information by others in the enterprise. As another example, computer aided manufacturing (CAM) platforms permit similar information regarding the specifics of building a given product to be specified and potentially shared with others.

Such tools tend to only focus on portions of the overall picture, however. For example, CAM platforms permit a manager to focus on manufacturing issues but do little or nothing to permit issues presented by the design itself to be easily considered. In similar fashion, CAD platforms permit a manager to focus on the design of a product but can occlude manufacturing-related issues from due consideration. In general, however, a manager cannot readily obtain and/or utilize information regarding both the specific components used to construct a given product and the specific manufacturing processes (including the specific component manipulators) that are used to assemble such components. This, in turn, presents an obstacle to understanding or utilizing corresponding cost information, resource availability information, de-fabrication issues, and so forth. Such conditions can themselves lead to less-than-optimum product offerings and/or non-competitive offerings.

BRIEF DESCRIPTION OF THE DRAWINGS

The above needs are at least partially met through provision of the manufacturing and de-fabrication analysis method and apparatus described in the following detailed description, particularly when studied in conjunction with the drawings, wherein:

FIG. 6 comprises a portion of a generic assembly/disassembly tree as configured in accordance with an embodiment of the invention;

FIG. 7 comprises a schematic view of a product input file as configured in accordance with an embodiment of the invention;

FIG. 8 comprises a schematic view of an exemplary product input file as configured in accordance with an embodiment of the invention;

FIG. 9 comprises a tabular view of a structured product coding system as configured in accordance with an embodiment of the invention;

Figure 1:
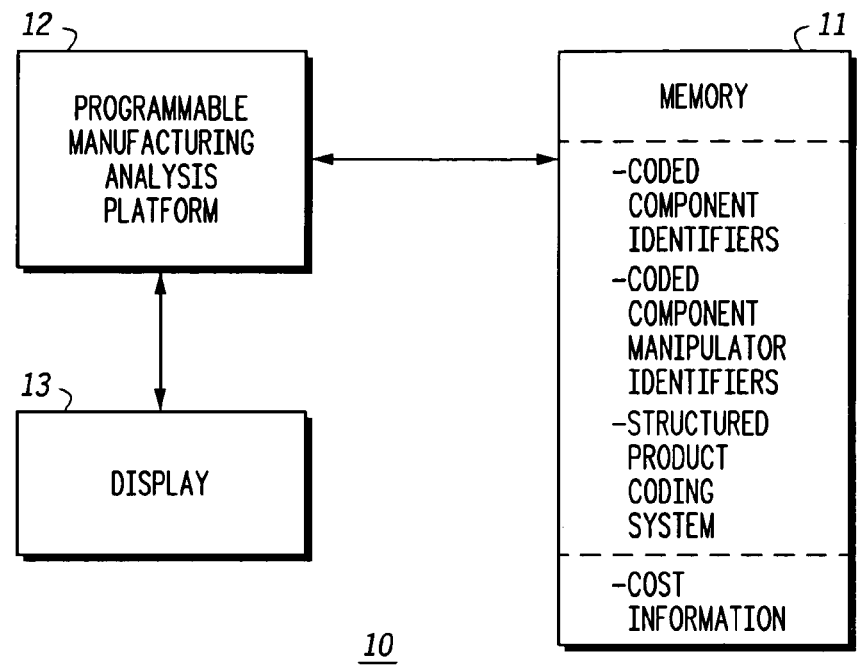
FIG. 1 comprises a block diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

SUMMARY OF THE INVENTION

Generally speaking, pursuant to these various embodiments, individual product components are coded using corresponding coded component identifiers, component manipulators are coded using corresponding coded component manipulator identifiers, and part-mating operations are coded using corresponding coded part-mating identifiers. A structured product coding system is then formed for a given product by identifying the components that are used to fabricate the product and then identifying specific component combinations as specific structured product coding system entries.

Pursuant to a preferred approach, an initial discrete parsed combination of at least two of the components to be effected as corresponds to initiation of fabrication of the given product is identified. In addition, at least one component manipulator is identified to make the initial discrete parsed combination with an identified part-mating operation. The coded component identifiers and the coded component manipulator identifiers plus the coded part-mating operations are then used to represent the identified initial discrete parsed combination as a corresponding structured product coding system entry. Subsequent discrete parsed combinations are then identified in a like manner. In a preferred embodiment, at least some of these subsequent discrete parsed combinations include a component and an earlier discrete parsed combination, where again the coded component identifiers, the coded component manipulator identifiers and the coded mating operations are used to represent the constituents of the corresponding combination as another structured product coding system entry.

In a preferred approach, all of the components as used by a given manufacturer for all of its products are coded. Preferably, a component that is used in more than one product will nevertheless have a single corresponding coded component identifier, such that reuse of that identifier will occur over a plurality of products. Also in a preferred approach, the identifier will comprise, at least in part, an alphanumeric string that comprises parsed information fields.

In a preferred approach, component manipulators are coded as a function, at least part, of the type of component manipulator and/or as a function, at least in part, of specific characteristics of the component manipulator.

In a preferred approach, these identifiers are used to specify a node within the structured product coding system such as, for example, a node or leaf that comprises a part of a structured product coding system hierarchical tree including but not limited to a binary assembly (and/or disassembly) tree.

So configured, such a structured product coding system can serve a variety of managerial and line functions including, but not limited to, manufacturing cost prediction, de-fabrication processing, de-fabrication cost prediction, inventory control and so forth. Such a structured product coding system further provides a substantially more encompassing view of the entire product (from design to manufacture to disassembly) than past platforms or processes and thereby provides a more powerful integrated analysis tool.

DETAILED DESCRIPTION

Referring now to the drawings, and in particular to FIG. 1, a platform 10 suitable to support these teachings generally comprises, in a preferred embodiment, a memory 11, a programmable manufacturing analysis platform 12, and a display 13 (other accouterments as are suitable or typical to facilitate the support and/or usage of such a platform, such as a keyboard, a cursor movement device, a printer, a network connection, and so forth are well understood in the art and are not shown for the sake of brevity and clarity).

The memory 11 can be a discrete mechanism as suggested in the illustration (and either comprising a single memory platform or one that is distributed, locally or remotely, over a plurality of memory platforms) or can be integrated with the programmable manufacturing analysis platform 12, all as well understood in the art. As will be presented in more detail below, the memory 11 serves to contain coded component identifiers that each correspond to a particular individual product component as may be available for use during manufacturing, coded component manipulator identifiers that each correspond to a particular individual component manipulator as may be available for use during manufacturing, and a structured product coding system for at least one given product, which structured product coding system comprises uniquely identified and coded nodes that are at least partially based upon the coded component identifiers, the coded part-mating operations, and the coded component manipulator identifiers (wherein at least some of the coded nodes correspond to discrete manufacturing combinations of product components and at least one of the component manipulators as is used to effect the manufacturing combination). In a preferred embodiment, the coded component identifiers collectively represent substantially all of the individual product components as are available to a given user. In a similar fashion, the coded component manipulator identifiers also preferably collectively represent all of the individual component manipulators as are available to a given user.

Optionally, the memory 11 can contain other kinds of related information such as, for example, cost information as correlates to the individual product components or individual component manipulators (and/or the use of such manipulators) or both (other related information could be similarly stored such as, for example, cost information as correlates to sub-assemblies comprised at least in part of the individual product components) as well as to individual part-mating operations (including, for example, all operational expenses as will be incurred during manufacturing). In one embodiment, when available, such cost information could be included or otherwise represented within the appropriate corresponding coded component identifier and/or coded component manipulator identifier.

The programmable manufacturing analysis platform 12 preferably comprises, for example, a computer (or plurality of networked computers). This platform 12 operably couples to the memory 11 to permit the former to write and/or to read to the latter as appropriate to support a given task. This platform 12 can be any of a wide variety of suitable platforms as are presently known or hereafter developed. In general, this platform 12 should preferably be programmable to permit operation that is compatible with the various processes and tasks described herein and otherwise in accordance with well understood prior art practice and technique. The display 13 can be any active display technology as may be appropriate to a given setting and application. In general, the display 13 serves to present information to a given user, including, for example, specific structured product coding system entries.

Figure 2:
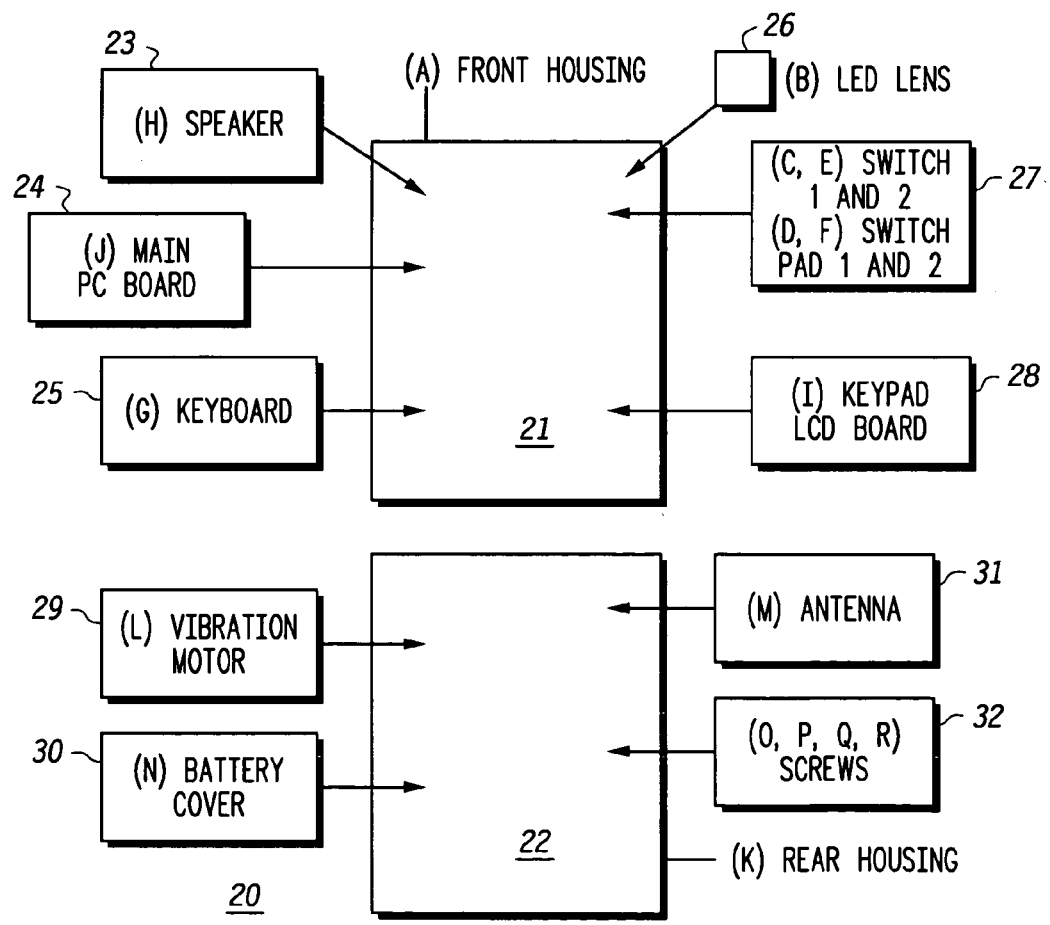
FIG. 2 comprises a block diagram of the components that comprise an illustrative product.

Prior to describing these embodiments in greater detail, it will likely be helpful to the reader if occasional reference is made to an illustrative product example. Therefore, and referring now to FIG. 2, an exemplary product 20 comprises a handheld wireless communication device having a front housing (A) 21 and a rear housing (K) 22. Other components that are attached to the front housing 21 include a speaker (H) 23, a main printed circuit board (J) 24, a keyboard (G) 25, a light emitting diode lens (B) 26, two switches (C and E) and two corresponding switch pads (D and F) 27, and a keyboard liquid crystal display board (I) 28. Other components that are associated more with the rear housing 22 include a vibration-imparting motor (L) 29), a battery cover (N) 30, and an antenna (M) 31. Four screws (O, P, Q, R) 32 serve to couple the front and rear housings 21 and 22 together. Reference will be made herein to this illustrative product where appropriate.

Figure 3:
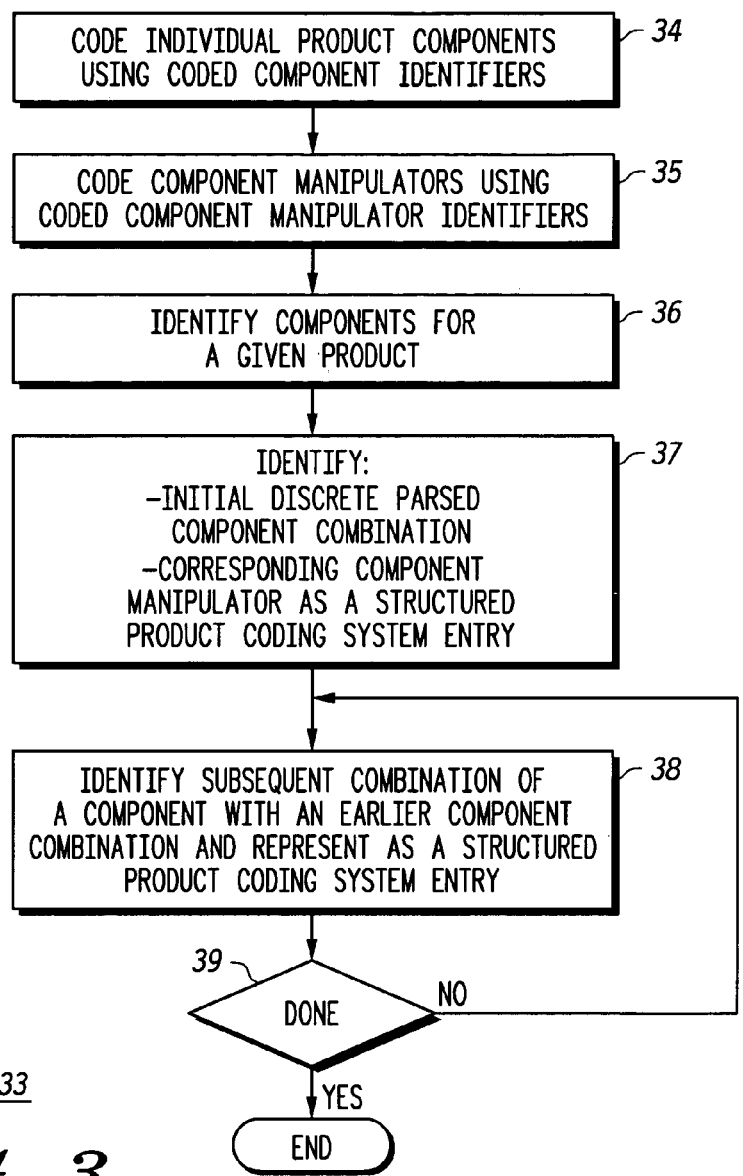
FIG. 3 comprises a flow diagram as configured in accordance with an embodiment of the invention.
Figure 4:
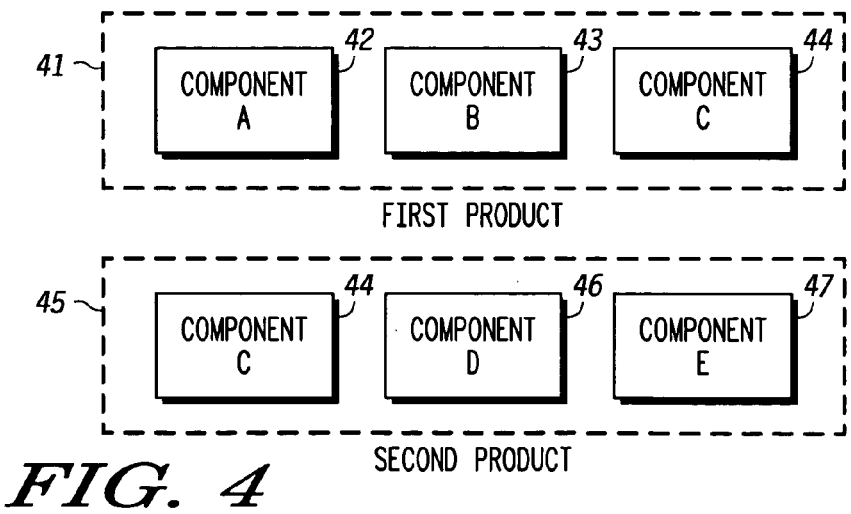
FIG. 4 comprises an illustrative schematic view of the components that comprise two products.

Referring now to FIG. 3, the above described platform 10 serves to facilitate a process 33 that includes coding 34 a plurality of individual product components using at least corresponding coded component identifiers. Preferably, all of the components as are used to fabricate a given product will be so coded, including in general all consumable items that are used to form the product. Also preferably, to the extent that the manufacturer fabricates more than one product, all of the components of all of the products will be so coded. It is also preferred that any components that are used in more than one product will nevertheless have only one corresponding coded component identifier. For example, and referring momentarily to FIG. 4, a first product 41 can be comprised of three components, a component A 42, a component B 43, and a component C 44. A second product 45 is similarly comprised of three components (component C 44, component D 46, and component E 47). In this illustrative example, both products 41 and 45 share a common component C 44. Pursuant to a preferred approach, this component C 44 would have a single coded component identifier notwithstanding the fact that this part is used across multiple products. As will be demonstrated in more detail below, the coded component identifiers can be comprised, at least in part, of an alphanumeric string, and the alphanumeric string can particularly include multiple parsed information fields. As such coded component identifiers are derived and assigned they can be stored (for example, in a database) in the memory 11 or elsewhere as desired.

Referring again to FIG. 2, the components of this product 20 have each been identified with a corresponding letter. For example, the front housing component 21 has the coded component identifier "A." A single letter identifier of course comprises only an illustration of this approach; in most settings, a longer identifier will be required to ensure that each identifier is unique. It is also possible to include other information in the identifier to further characterize the component. Additional alphanumeric fields can be used, for example, to identify the component source, an index that corresponds to difficulty of use during the manufacturing process, cost information, form factor information (including information regarding the dimensions of the component and/or the component's size relative to one or more fixed standards of interest), durability information (including information regarding operative temperature ranges, maximum permitted voltage/current, and so forth as appropriate), or a desirability index as regards use of the component (to take advantage, for example, of a volume discount or preferred source that pertains to a given component).

Referring now back to FIG. 3, this process 33 also provides for coding 35 the component manipulators as are used to assemble the components of the product using coded component manipulator identifiers. Component manipulators can include, generally, all of the mechanisms that are available and/or required to cause the various anticipated assembly steps to be realized. For example, a conveyor line, a gripping tool, a soldering tool, an end-effector, a component feed tool, robots of all types and variety, and essentially all non-consumable items that manipulate parts to facilitate assembly or disassembly of a given product are all suitable examples of component manipulators. The coded component manipulator identifiers can again be comprised, if desired, of alphanumeric strings. Such identifiers can comprise a simple unique symbol or expression that corresponds to a given manipulator, or, if desired, can further include additional information in other fields. For example, information regarding the categorical type of manipulator or of other special characteristics regarding the manipulator can be expressed in this way. As with the coded component identifiers, the coded component manipulator identifiers can also be stored (for example, in a database) in the memory 11 as assigned and as desired.

In a preferred embodiment, the component manipulator information that correlates to a given coded component manipulator identifier includes cost information that reflects the operating cost as is associated with the manipulator. Such cost information is likely to be relatively static, though if desired, this information can be varied on a product by product basis to take into account unique circumstances or weighting factors and considerations. Such cost information should include the costs that are relevant to the immediate concerns of the enterprise in question, such as, for example, any or all of acquisition costs, maintenance costs, operating costs, and the like.

At least some, and preferably all of the components as are to be used to fabricate the product are then identified 36. In a preferred approach, the components are expressed through use of the corresponding coded product identifiers. To illustrate, and again referring to the example product 20 depicted in FIG. 2, this wireless communications device is formed of the components A, B, C, D, E, F, G, H, I, J, K, L, M, N, O, P, Q, and R.

Referring again to FIG. 3, the process 33 then provides for identification 37 of an initial discrete parsed combination of at least two of the components, which combination comprises a first step of the manufacturing process for that product. In this embodiment, this action also includes identification of the handling operation that is used to effect this first combination of components. The coded identifiers as correspond to these identified elements are then used to represent the identified initial discrete parsed combination as a particular corresponding structured product coding system entry (as, for example, a node or a leaf in a corresponding heirarchical representation of the product).

For example, and with continuing reference to the example product 10 described above and referring momentarily to FIG. 5, as an initial manufacturing step, the front housing (A) 51 is combined with one of the switch pads (D) using the handling operation (i.e., a part-mating operation) represented by the structured assembly coding system (SACS) code "1012" 53 to yield the initial discrete parsed combination AD 54, the latter comprising, in this illustrative example, an entry in the corresponding structured product coding system. Such exemplary SACS codes each comprise a numeric code (such as, for example, a 4-digit code) that represents a specific assembly operation as is well understood in the art. These SACS codes, for both components and manipulators, can be retained in a corresponding database in the memory 11 referred to above if desired.

Referring again to FIG. 3, following this initial combination, the process 33 then identifies 38, in turn, each subsequent combination. Of course, many or all of the subsequent combinations will be between an earlier specified combination and a discrete component. It is also possible that two earlier combinations are subsequently themselves combined with one another. To illustrate, and referring again to FIG. 5, the next subsequent combination joins the initial discrete parsed combination AD 54 with a discrete component C 55 (which, in the example product 20, comprises a switch as specified above). In particular, this component and earlier combination are joined, again through usage of the assembly operation "1012" 56, to yield the subsequent discrete parsed combination ADC 57 (the latter being the result of combining the coded component identifiers for the joined elements).

Figure 5:
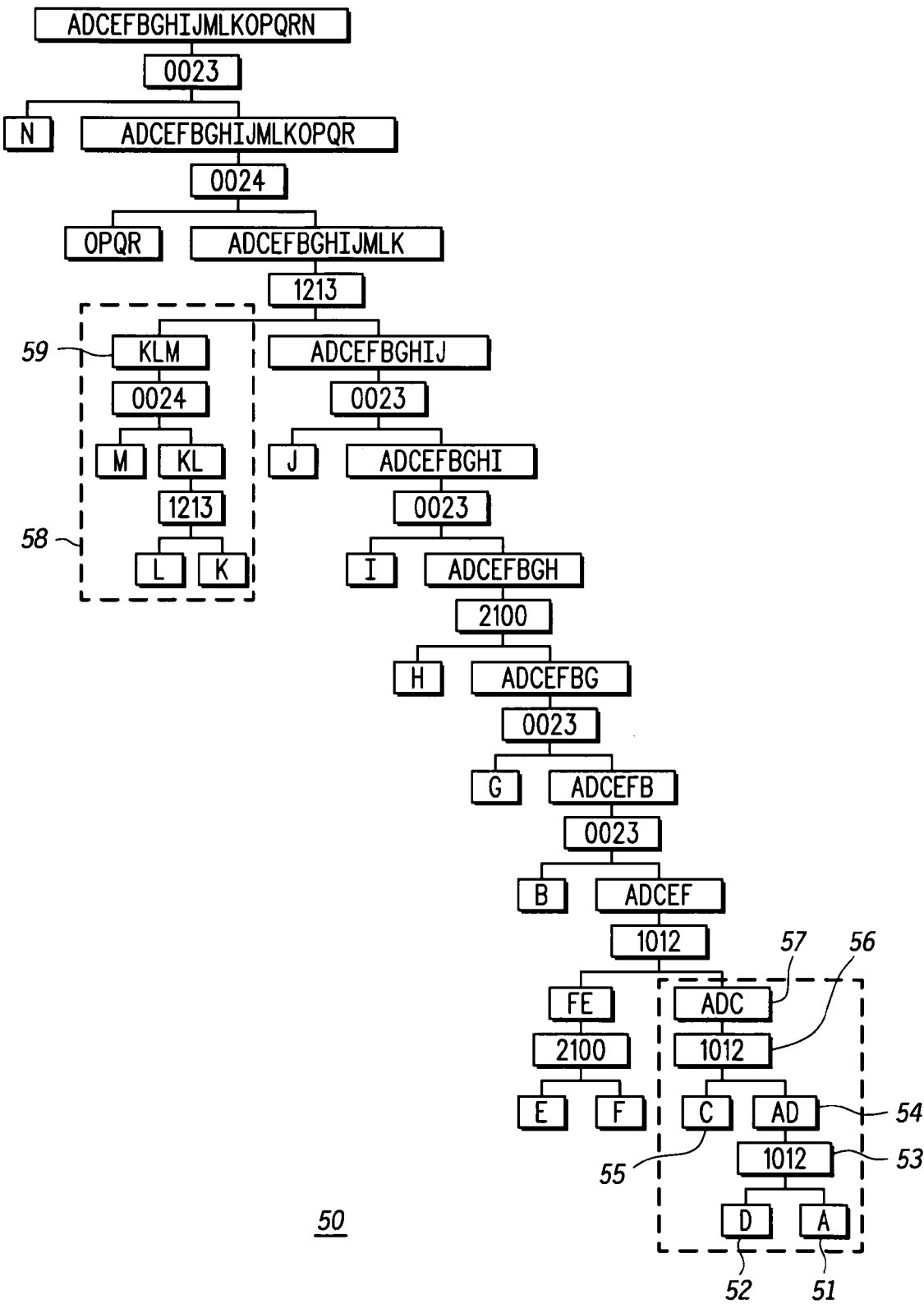
FIG. 5 comprises a binary tree as configured in accordance with an embodiment of the invention.

With reference again to FIG. 3, the process 33 determines whether a conclusion has been reached 39 (i.e., a determination is made as to whether the product 20 has been fully articulated). When uncombined components yet remain, the process 33 essentially repeats itself to facilitate the generation of additional corresponding structured product coding system entries. To illustrate, FIG. 5 depicts the complete assembly instructions for the exemplary product 20 in the form of a binary assembly tree 50 (in fact, in such an embodiment, the tree more appropriately comprises a binary assembly/disassembly tree as the information presented is relevant to a disassembly process as well as to an assembly process). In particular, in seriatim and heirarchical fashion, each component becomes eventually added to the growing product platform via a specified assembly operation. In general, it can be seen that such a binary assembly tree 50 readily defines and presents the sequence by which components are merged and the types of operations that are used to effect the merging of components.

As noted earlier, sub-assemblies can be combined with sub-assemblies if desired. Reference numeral 58 corresponds to the parallel creation of such a sub-assembly, which yields the discrete parsed combination KLM 59 (which corresponds, in the ongoing example, to a sub-assembly comprising the rear housing (K), the vibration motor (L), and the antenna (M)). Such a binary tree 50 can be seen to be generally comprised of a plurality of hierarchically related nodes or leaves that each correspond to a particular structured product coding system entry.

Such a binary tree, once (or as) created, can be stored in the memory 11, displayed on the display 13, and/or utilized by the programmable manufacturing analysis platform 12 in various ways to illuminate relevant aspects of the assembly or disassembly process. Such a binary tree provides a considerably amount of helpful information and can serve, in and of itself, as a useful design and management tool. In a preferred embodiment, however, this binary tree 50 serves to facilitate generation of a higher resolution and more detailed view of the product via generation of a generic assembly/disassembly tree 60 as illustrated in FIG. 6. Such a generic assembly/disassembly tree 60 comprises a parts-merging binary tree that can represent a work cell environment including all relevant components, tools, fixtures, and manipulators (though in this embodiment, all objects in the work cell are characterized as either a component or a manipulator).

To generate this generic assembly/disassembly tree 60, the user selects the specific manipulators from amongst the previously identified and coded manipulators that are to be used to facilitate the necessary assembly operations. In particular, the user selects and assigns specific manipulators for use with each of the components identified in the earlier defined binary assembly tree 50 to effect the specified assembly operation as are associated therewith. It will be readily appreciated that; before a given component is ready to be merged with another component or sub-assembly, a sequence of operations will often be necessary. For example, a given component may first need to be staged in a feeder, and then a robot with a gripper will capture the component from the feeder. As will be shown below, the generic assembly/disassembly tree 60 serves to capture and encode such a sequence of operations while also identifying specific manipulators to effect such operations.

In a preferred embodiment, a specific product input file serves to encode such information in a particular fashion. With momentary reference to FIG. 7, the product input file 70 includes a first field 71 to present the name of a stationary object (such as a stationary component), a second field 72 to present the name of a moving object (that is, an object such as a manipulator to be moved with respect to the stationary object during the assembly operation), and a third coded field 73 to present information regarding the corresponding assembly node location. Collectively, such a product input file 70 can represent the merging operation of two components, two manipulators, or of a component and a manipulator. In this embodiment, the location field 73 is itself further divided into two sub-fields, "Level" 74 and "Index" 75. The former represents the tree level at which the assembly operation takes place in the assembly tree and the latter is a unique integer that distinguishes different assembled components or manipulators on the same tree level (for example, all leaf nodes of an assembly tree can have level "zero" and the ultimately assembled product can have the highest attainable level—so configured, operations that can be executed at substantially the same time can share the same level).

To illustrate, and referring now to FIG. 8, at one level during the assembly process, it may be necessary to place a given part $P_A$ onto a manipulator comprising a feeder $H_A$ while substantially simultaneously having a manipulator comprising a robot $H_{R1}$ grasp a manipulator comprising a gripper $H_{GA}$. The robot then uses the gripper to pick up the part from the feeder. In this example, these elements are represented within corresponding product input files 70 as follows:

Component $P_A$=P_A
Manipulator feeder $H_A$=H_A
Manipulator gripper $H_{GA}$=H_G_A
Manipulator robot $H_{R1}$=H_R_1

It can be seen that the operation that sees to the placement of the component (as the stationary object) on the feeder (as the moving object) and the operation that sees to the selection of the gripper (as the stationary object) by the robot (as the moving object) occur at the same level "0" of the assembly tree, with the latter operation having index "0001" to aid in differentiating it from the former. This four-digit index is used as an illustrative example and can accommodate the coding of a maximum of ten thousand objects. If there is a need to code a greater number of objects, extra digits can of course be included to meet such a need. The resultant assembled part, however, is specified as occupying a next level "1" in the assembly tree.

Figures 10, 11:
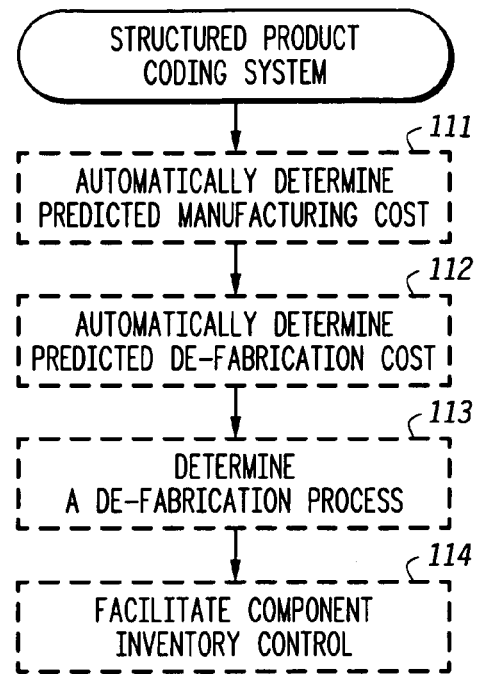
FIG. 10 comprises an exemplary ordered presentation of a product input file as configured in accordance with an embodiment of the invention.
FIG. 11 comprises a flow diagram as configured in accordance with an embodiment of the invention.

Using such a convention, a complete product input file can be formulated to represent the entire assembly (and/or disassembly) of a given product. For example, and referring again to the example wireless communications device presented earlier, a product input field for handling the eighteen constituent components of that product can be set forth as depicted (in part) in FIG. 10. Such a file assigns a manipulator to every component defined in the assembly tree's leaf nodes. For example, component P_A 100 requires a manipulator comprising a part feeder H_A 101 while another manipulator comprising a gripper H_G_A 102 requires another manipulator comprising a robot H_R_1 103 to wield it. Such an information set comprises a BEGIN-END block. It will be understood by those skilled in the art that any other pair of block limiters can also be used to confine such an information set. Extracting from the exemplary information set, an intermediate component can be expressed by the notation H_R_1.H_G_A.P_A.H_A.

After obtaining such data regarding components and manipulators from the corresponding product input files as developed for a given product, a product database can be formed using corresponding structured product coding system entries. In a preferred embodiment, and referring now to FIG. 9, the structured product coding system code can consist of eight primary fields (though it need not be limited to eight such fields if extra fields are required and/or otherwise useful to code additional information). A first field 90 comprises a name such as an alphanumeric string expression to identify a given part-mating operation, component, manipulator, or intermediate assembly Initially this product database comprises mating operations, components, and manipulators.

For example, "AGAINST_FIT" represents a part-mating operation of putting one-part against-fit another part. As for part-components and manipulators, this name field is preferably comprised of three sub-fields separated by an underscore symbol that represent whether the thing being identified is a component ("P") or a manipulator ("H") and that provide a name for the object and a number for the object. A combination of components and manipulators represents an intermediate module created by the structured product coding system. A second field 91 identifies the stationary component by both type and index where appropriate, and a third field 92 identifies the moving component by both type and index where appropriate. Then, a fourth field 93 characterizes the resultant sub-assembly by type and index. In a preferred embodiment, "type" comprises an integer that identifies the object in that row as a component, a manipulator, or a mating operation. The "index" serves to identify different objects that are of the same type. To illustrate, in one embodiment, it may be appropriate to designate seven "types" as follows:

Type N/A-not applicable
Type 0-a part mating operation
Type 1-a component
Type 2-a gripping manipulator
Type 3-a feeding manipulator
Type 4-a robotic manipulator
Type 5-an intermediate sub-assembly of components.

Simple components by themselves do not require any other parts or operations and may therefore be tagged with type N/A. Other types can of course be added as appropriate to a given application and setting.

A fifth field 94 retains the SACS code that is associated with either the assembly or disassembly operation that corresponds to this object. Such information serves to aid in generating correct assembly and disassembly manufacturing instructions and also aids in calculating a final product assembly or disassembly cost. If desired, simple components by themselves do not necessarily require entry of a corresponding SACS value. A sixth field 95 further characterizes the corresponding SACS entry as representing an assembly operation (in which case the sixth field entry can comprise a "+" symbol) or a disassembly operation (in which case the sixth field entry can comprise a "−" symbol).

The seventh field 96 preferably contains an integer value that represents the assembly tree level at which the component combination will occur. Such a value can be especially useful when seeking to optimize the assembly tree or for optimizing factory assembly equipment layouts.

The eighth field 97 contains pertinent assembly (and/or disassembly) cost information which information can then be later used for cost estimation purposes. In general, of course, the cost associated with a SACS operation will comprise a composite object. That is, the cost expression actually comprises a set of variables relevant to characterizing the overall cost of an operation. Such a variable can include, but is not limited to, cycle time for executing the operation, tooling costs for enabling the SACS code execution, process yield over a large number of operations, mean time between failure during a large number of operations, and the amount (or quality) of manual intervention needed to operate the equipment. A nominal representative cost can be calculated for each SACS operation by assigning a coefficient (based on its respective importance) to each of the selected measurable cost variables.

The above information readily serves to permit the generation of a corresponding generic assembly/disassembly tree such as that referenced earlier in FIG. 6. (The generic assembly/disassembly tree 60 in this illustration corresponds to only a small portion of the binary tree 50 presented above; in particular, that portion of the binary tree 50 that presents the combination of the front housing (A) 51 with a switch pad (D) 52 to yield the combination AD 54, which combination AD 54 is then combined with a switch (C) 55 to yield the combination ADC 57 as already described in detail above.) In this view of a preferred embodiment, each identifier window 61 includes a plurality of fields (shown, for the sake of convenience, as vertically and horizontally distinguished blocks of alphanumeric strings).

In this embodiment, there are five such fields. The bottom layer of an exemplary block includes a first block 62 of information that identifies provision of two children nodes comprising a stationary object and a second block 63 of information that identifies provision of a moving object. In this embodiment, this information is derived from the corresponding product database, partly illustrated by FIG. 9, that the structured product coding system generates. The stationary object "50007" 62 comprises the child object $H_{B2}H_{GD}P_D$ and the moving object "50003" 63 comprises the child object $H_{B1}H_{G4}P_4$. The next layer 64 in the block 61 identifies the SACS code (1012) that characterizes the assembly operation of semi-against fitting two parts together. The next layer 65 comprises the new name of the resultant subassembly (in this case, "$H_{B2}H_{GD}P_DH_{B1}H_{G4}P_4$" to reflect the combination of the stationary and moving objects), and the top layer 66 comprises the new identifying number for the resultant subassembly. In this particular example, the new identifying number for the block 61 being discussed is "50008," where the "5" reflect the type of object (i.e., a subassembly) and the "0008" comprises its index with four digits being used in this example for index coding.

The lowermost blocks in the generic assembly/disassembly tree 60 depicted in FIG. 6 exist at the 0 level and hence, by definition, do not have any corresponding child nodes. It should be understood and appreciated that all of the children's nodes, structured product coding system codes, and names set forth in this tree are obtained from the product input file that defines the components and manipulators. For example, the type and index information from the product input file finds application when ascertaining the new identifying number for the resultant object and the alphanumeric name of the resultant object derives directly from a combination of the names of the children nodes as appears in the product input file.

Of course, in a preferred approach, the newly generated information is then entered into the structured product coding system as a new entry and can be stored, for example, in the memory 11 described earlier.

Such processes are repeated to complete the generic assembly/disassembly tree. That portion of the tree for the exemplary wireless communications device product as is shown in FIG. 6 represents the assemblage of three components: the front housing (part A 51), a switch pad (part D 52), and a switch (part C 55) using required handlers and grippers. As already specified by the binary tree 50 (depicted in relevant part in FIG. 6), part A and part D are assembled first followed by combination with part C.

This generic tree 60 also specifies how the manipulators are disengaged and/or disassembled during the fabrication process. For example, the object identified by the number "50008" represents a combination of both components and manipulators—$H_{B2}H_{GD}P_DP_AH_{GA}H_{B1}$. Block 67 represents the disengagement of the two manipulators $H_{B2}$ and $H_{GD}$ (as represented by block 68) where the resultant object name is reduced to $H_{B1}H_{GA}P_AP_D$.

Such a structured product coding system can be used in a variety of ways. For example, and referring now to FIG. 11, the structured product coding system can be used to automatically determine a predicted manufacturing cost 111 or a de-fabrication cost 112 of a given product. For example, in a generic assembly/disassembly tree, each SACS code as comprises a part of the structured product coding system can be associated with two operation costs (one for assembly and one for disassembly actions, respectively, as usually the cost of an assembly operation will not equal the cost of a disassembly operation for a given manipulator). By summing up these individual costs for all SACS operations in an assembly tree, a total cost for product assembly and/or disassembly can be readily and automatically attained. It will also be appreciated that a manager having access to the structured product coding system for a given product can alter specific objects to test their impact on the overall cost of assembly or disassembly. For example, the manager can test the substitution of a given manipulator with a different machine or approach in order to assess the resultant cost differential.

As another example, the structured product coding system can be used to facilitate determination 113 of a particular de-fabrication process. That is, by having ready access to the fabrication process as clearly and fully articulated by the generic assembly/disassembly tree, a manager has access to at least one potential approach to de-fabrication, i.e., a reversal of the specified assembly process.

As yet another example, the structured product coding system can serve to facilitate 114 inventory control for the components and/or sub-assemblies comprised, at least in part, of the components that are used to assemble the product insofar as this information clearly specifies both the particular components that are required and the quantities of each that must be provided to permit complete fabrication of the desired product. In a similar vein, the structured product coding system can serve to facilitate a maintenance schedule for the manipulators that are utilized to assemble the product. In particular, this information clearly indicates the number of times a given manipulator or process is utilized and hence permits ready prediction of usage-based maintenance activities.

So configured, it can be seen that a useful structured product coding system can be developed to generate generic assembly and disassembly trees from binary assembly trees as correspond to specific products. This in turn permits ready evaluation of the product in a so-called C3P operational environment (where "C3P" refers to computer aided engineering, computer aided design, and computer aided manufacturing as is generally well understood in the art). This structured product coding system serves to capture information regarding manipulators and intermediate sub-assemblies in addition to basic components. A database can serve to store such information regarding manufacturing operations, a product's components, manipulators, and intermediate parts as are created during the assembly (or disassembly) process. Based upon such information, a generic assembly/disassembly tree can be created to facilitate evaluation of a given product's cost, design, and overall manufacturing efficiency.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, it would be possible for a given component source, industry group, standards body, government agency, or other interested party to effect the identifier codification described above, as versus each manufacturer (or some subdivision thereof) assigning identifiers in a manner unique to that manufacturer.

We claim:

1. A method of forming a structured product coding system comprising:
   coding a plurality of individual product components using at least corresponding coded component identifiers;
   coding a plurality of component manipulators using at least corresponding coded component manipulator identifiers;
   coding a plurality of part-mating operations for at least one of assembly and disassembly as corresponds to at least some of the plurality of individual product components and the plurality of component manipulators;
   forming, in a manufacturing analysis platform, a structured product coding system for a given product by:
      identifying the components to be used to fabricate the given product;
      identifying part-mating operations to be used for manufacturing the given product;
      identifying an initial discrete parsed combination of at least two of the components and their part-mating operation to be effected as corresponds to initiation of fabrication of the given product and further identifying at least one of the component manipulators to be used to make the initial discrete parsed combination and using the coded component identifiers, the coded part-mating operation identifier and the coded component manipulator identifiers to represent the identified initial discrete parsed combination as a particular corresponding structured product coding system entry;
      identifying a subsequent discrete parsed combination of at least the initial discrete parsed combination and at least one of the components and one of the coded part-mating operations to be effected as further corresponds to continuation of the fabrication of the given product and further identifying at least one of the component manipulators to be used to make the subsequent discrete parsed combination and using the coded component identifiers and the coded component manipulator identifiers and the coded part-mating operation identifier to represent the identified subsequent discrete parsed combination as another corresponding structured product coding system entry.

2. The method of claim 1 wherein coding a plurality of individual product components includes coding, for a plurality of different products, the individual product components that substantially comprise such different products using at least corresponding coded component identifiers such that a given component as used in more than one product will nevertheless have a single corresponding coded component identifier.

3. The method of claim 1 wherein coding a plurality of individual product components using at least corresponding coded component identifiers includes using coded component identifiers that are comprised, at least in part, of an alphanumeric string.

4. The method of claim 3 wherein using coded component identifiers that are comprised, at least in part, of an alphanumeric string includes using coded component identifiers that are comprised, at least in part, of an alphanumeric string wherein at least portions of the alphanumeric string comprise parsed information fields.

5. The method of claim 1 wherein coding a plurality of component manipulators using at least corresponding coded component manipulator identifiers includes coding a plurality of component manipulators as a function, at least in part, of a type of component manipulator.

6. The method of claim 5 wherein coding a plurality of component manipulators as a function, at least in part, of a type of component manipulator further includes coding at least one of the component manipulators as a function, at least in part, of specific characteristics of the at least one component manipulator.

7. The method of claim 1 wherein identifying the components to be used to fabricate the given product includes identifying all of the components that are to be used to fabricate the given product.

8. The method of claim 1 wherein using the coded component identifiers and the coded component manipulator identifiers and the coded part-mating operation identifier to represent the identified initial discrete parsed combination as a particular corresponding structured product coding system entry includes using the coded component identifiers, the coded part-mating operation identifier and the coded component manipulator identifiers to specify a structured product coding system node.

9. The method of claim 8 wherein using the coded component identifiers, the coded part-mating operation identifier and the coded component manipulator identifiers to specify a structured product coding system node includes specifying the node as a part of a structured product coding system hierarchical tree.

10. The method of claim 9 wherein specifying the node as a part of a structured product coding system hierarchical tree includes specifying the node as a part of a structured product coding system binary assembly/disassembly tree.

11. The method of claim 1 wherein using the coded component identifiers and the coded component manipulator identifiers and the coded part-mating operation identifier to represent the identified initial discrete parsed combination as a particular corresponding structured product coding system entry and using the coded component identifiers, the coded part-mating operation identifier and the coded component manipulator identifiers to represent the identified subsequent discrete parsed combination as another corresponding structured product coding system entry includes presenting the structured product coding system entries on an active display.

12. The method of claim 11 wherein presenting the structured product coding system entries on an active display includes presenting the structured product coding system entries as leaves on a hierarchical assembly/disassembly tree.

13. The method of claim 1 and further comprising using the structured product coding system to automatically determine a predicted cost of manufacturing the given product.

14. The method of claim 1 wherein forming a structured product coding system for a given product further includes identifying component manipulator resetting actions to be effected as corresponds to fabrication of the given product and using the coded component manipulator identifiers to represent the identified component manipulator resetting actions as particular corresponding structured product coding system entries.

15. The method of claim 1 and further comprising using the structured product coding system to automatically determine a predicted cost of at least partially de-fabricating the given product.

16. The method of claim 1 and further comprising using the structured product coding system to determine a de-fabrication procedure to facilitate at least partial de-fabrication of the given product.

17. The method of claim 1 and further comprising using the structured product coding system to facilitate inventory control of at least one of:
   at least some of the plurality of individual product components; and
   at least some sub-assemblies comprised of at least some of the plurality of individual product components.

* * * * *